W. A. BROWN.
Bread-Slicers.
No. 158,827.  Patented Jan. 19, 1875.
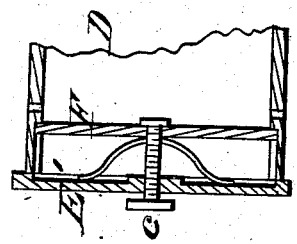
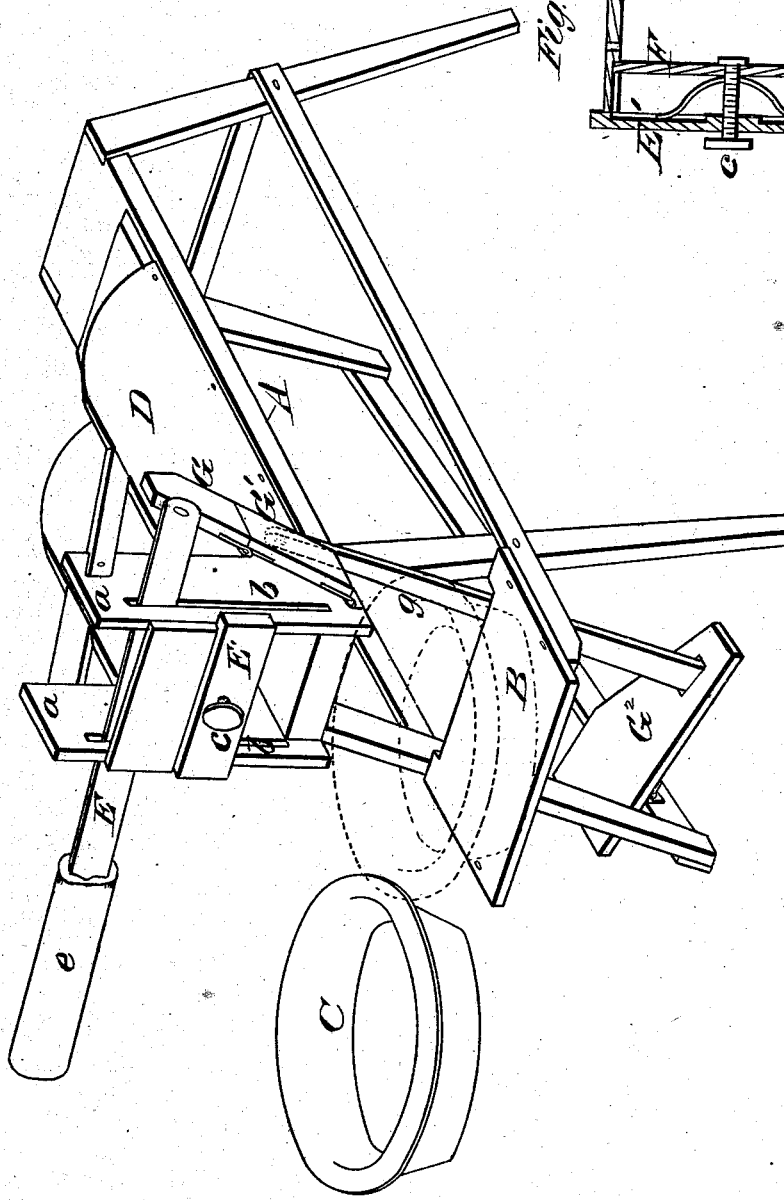
WITNESSES
E. A. Bates
Robert Everitt
INVENTOR
William A. Brown,
Chipman Hosmer & Co,
ATTORNEYS

UNITED STATES PATENT OFFICE.

WILLIAM A. BROWN, OF EUREKA, ILLINOIS.

IMPROVEMENT IN BREAD-SLICERS.

Specification forming part of Letters Patent No. 158,827, dated January 19, 1875; application filed October 24, 1874.

*To all whom it may concern:*

Be it known that I, WILLIAM A. BROWN, of Eureka, in the county of Woodford and State of Illinois, have invented a new and valuable Improvement in Bread-Slicers; and I do hereby declare that the following is a full, clear, and exact description of the construction and operation of the same, reference being had to the annexed drawings making a part of this specification, and to the letters and figures of reference marked thereon.

Figure 1 of the drawing is a representation of a perspective view of my bread-slicer, and Fig. 2 is a detail view of the same.

This invention has relation to means for slicing bread, wherein a vertically-reciprocating guided knife is employed, in combination with an adjustable gage, for regulating the thicknesses of the slices, and a trough for holding the loaves while they are being sliced.

The nature of my invention consists mainly in a guided vibrating knife, having its fulcrum on one of two jointed arms, in combination with a treadle, which is connected to the other jointed arm, whereby the knife is bodily adjustable, and, by means of the treadle, it can be held in proper position for any size of loaf, and the force of the leg utilized in performing the operation of cutting, as will be hereinafter explained.

In the annexed drawings, A designates a table, which is constructed to afford a support for my improved bread-slicer, and B designates a shelf, which supports a pan, C, into which the slices fall as they are cut from the loaf. D designates a trough, which is composed of two vertical sides rising from a bottom, which trough is secured upon one end of the table A by means of screws or other suitable devices, which will allow the trough to be removed conveniently. At one end of the trough D two guides, $a\ a$, are constructed with slots $b\ b$, through which a straight vertically-vibrating knife, E, freely plays. There is also applied at one end of the trough D, between the knife E and a cross-bar, E', a gage-board, F, which is adjustable by means of a screw, $c$, for regulating the thicknesses of the slices to be cut from a loaf of bread. Below the bar E' there is a free space for allowing the slices of bread to fall into the pan C as rapidly as they are cut. On one end of the knife E a handle, $e$, is secured, and the other end of this knife is pivoted to the upper end of a jointed arm, G, the lower end of which arm is hinged or pivoted to another arm, $G^1$, which latter is pivoted or hinged to the lower end of one of the guides $a$.

By this arrangement of a knife and two arms, I afford the knife a vertically-adjustable fulcrum; at the same time I allow a draw-stroke to be given to the knife in whatever position its fulcrum may be held.

$G^2$ designates a treadle, which is pivoted to one of the horizontal bars of the table A, and which is connected by means of a rod, $g$, to the arm $G^1$ at a point between the two hinged joints of this arm, as shown in Fig. 1.

It is by means of the treadle $G^2$, controlled by the foot of the operator, that the position of the fulcrum of the knife E is adjusted for loaves of bread of different sizes; at the same time a pressure of the foot on the treadle will forcibly bring down the pivoted end of the knife, and assist the hand in the work of slicing.

What I claim as new, and desire to secure by Letters Patent, is—

1. In a bread-slicer, the combination, with a trough, D, and a knife, E, of the slotted guides $a\ a$, gage E', and jointed arms G $G^1$, substantially as described.

2. The treadle $G^2$ and rod $g$, combined with jointed arms G $G^1$, slotted guides $a\ a$, and a vibrating knife, E, substantially as described.

In testimony that I claim the above I have hereunto subscribed my name in the presence of two witnesses.

WILLIAM A. BROWN.

Witnesses:
B. D. MEEK,
ALEXR. BROWN.